(12) United States Patent
Gillespie et al.

(10) Patent No.: US 9,169,970 B2
(45) Date of Patent: Oct. 27, 2015

(54) LUBRICATION SYSTEM AND METHOD FOR VEHICLES PROVIDED WITH BLADE ELEMENT

(75) Inventors: David Gillespie, Durham (GB); Stephen Thompson, Tyne and Wear (GB)

(73) Assignee: Caterpillar Commercial SARL, Paris (FR)

( * ) Notice: Subject to any disclaimer, the term of this patent is extended or adjusted under 35 U.S.C. 154(b) by 1085 days.

(21) Appl. No.: 12/808,710

(22) PCT Filed: Dec. 4, 2008

(86) PCT No.: PCT/EP2008/066782
§ 371 (c)(1),
(2), (4) Date: Feb. 20, 2012

(87) PCT Pub. No.: WO2009/080459
PCT Pub. Date: Jul. 2, 2009

(65) Prior Publication Data
US 2011/0017550 A1 Jan. 27, 2011

(30) Foreign Application Priority Data
Dec. 19, 2007 (EP) .................................... 07150178

(51) Int. Cl.
*F16N 13/04* (2006.01)
*F16N 9/02* (2006.01)
*F16N 7/38* (2006.01)

(52) U.S. Cl.
CPC .. *F16N 9/02* (2013.01); *F16N 7/38* (2013.01); *F16N 7/385* (2013.01)

(58) Field of Classification Search
CPC ............. F16N 29/02; F16N 9/02; F16N 7/38; F16N 7/385
USPC ...................................................... 184/27.1, 26
See application file for complete search history.

(56) References Cited

U.S. PATENT DOCUMENTS

| | | | | |
|---|---|---|---|---|
| 2,870,849 A * | 1/1959 | Youngberg et al. | ........... | 172/413 |
| 2,996,149 A * | 8/1961 | Walker | ........................ | 184/27.4 |
| 3,461,990 A * | 8/1969 | May et al. | ......................... | 184/6 |
| 4,537,284 A * | 8/1985 | Breisinger et al. | ............. | 184/7.4 |
| 4,674,030 A * | 6/1987 | Gabriel et al. | ................... | 700/79 |
| 4,930,600 A * | 6/1990 | Kumar et al. | .................. | 184/3.2 |
| 5,060,760 A * | 10/1991 | Long et al. | ..................... | 184/6.4 |
| 5,381,874 A * | 1/1995 | Hadank et al. | ................. | 184/6.4 |
| 5,402,913 A * | 4/1995 | Graf | ................................ | 222/63 |
| 5,417,308 A * | 5/1995 | Hartl | .............................. | 184/6.4 |
| 5,482,138 A * | 1/1996 | Mori et al. | ...................... | 184/6.4 |
| 5,839,213 A * | 11/1998 | Abbott et al. | ................... | 37/443 |
| 6,409,121 B1 * | 6/2002 | Lindahl | ..................... | 244/100 R |

FOREIGN PATENT DOCUMENTS

| | | |
|---|---|---|
| EP | 1514774 | 7/2004 |
| WO | 98/00629 | 1/1998 |
| WO | 03/072392 A2 | 9/2003 |

* cited by examiner

*Primary Examiner* — Michael Mansen
*Assistant Examiner* — Michael Riegelman

(57) ABSTRACT

A lubrication system for a vehicle (100) is provided with a blade element (1) movable between a first position (2) and a second position (3); the lubrication system comprises a pump (4) connected to a reservoir of lubricant and an actuation element or striker (6) acting on the pump (4), the actuation element (6) being activated in response to the blade element (1) when displaced between the first (2) and the second (3) position.

17 Claims, 5 Drawing Sheets

LUBRICATION SYSTEM AND METHOD FOR VEHICLES PROVIDED WITH BLADE ELEMENT

RELATION TO OTHER PATENT APPLICATIONS

This application is the U.S. National Stage of PCT/EP2008/066782, filed Dec. 4, 2008, and claims priority to European Patent application number 07150178.7 filed Dec. 19, 2007.

TECHNICAL FIELD

This patent disclosure relates generally to articulated trucks provided with movable elements that require frequent greasing and, more particularly, to lubrication of ejector blade elements during operation.

BACKGROUND

The present disclosure relates generally to industrial machines, such as tipped articulated trucks, which may be designed to carry heavy loads in a carriage located at the rear of the vehicle. These articulated trucks may be operated substantially in road construction, mining fields, or in any other environment where it is necessary to move material from one location to another. Performance increases may be achieved when a moving element, for instance an ejector blade, is used in the unloading process to better control removal of the material from the carriage.

These machines have to be extremely reliable in operation, since a disorder would hinder the workflow significantly. When these machines are operated in locations where a service for the vehicle is either not present or remotely located, it can take a significant amount of time before they can be repaired or replaced.

However, these industrial machines may be subject to extensive wear and tear, due to the large loads they may carry and move in the carriage and to the unfavorable environment conditions, since construction or building sites are dirty environments where dust and dirt can quickly intrude in all connected moving parts, such as sliders, joints and hinges. Impurities intruded in a hinge, roller or piston can significantly interrupt the operation of the machine because of the increased friction between the elements. To remove the impurities the parts may need to be disassembled, which makes the machine inoperative for a certain time, a fact that can have significant impact, for example, on a road construction project.

Therefore, many parts may need to be greased regularly to ensure proper operation of the machine and avoid that certain moving elements become stuck or subjected to excessive friction. Conventional greasing systems, comprising a pump and a network of fixed lines distributing the lubricant to fixed lubrication points and usually operated electrically by the machine operator, are well known in the state of the art. Such known greasing systems supply lubricants to stationary points on the vehicle, such as the hinges connecting the ejection carriage to the chassis of an industrial machine. When an articulated truck with a movable blade element is involved, the moving parts of the blade element must typically be lubricated very frequently, for the blade element to operate properly. The lubrication process is carried out by the operator of the machine, who manually provides the lubricants to the moving parts. To do so, the operator must stop the machine, climb on the chassis to reach the blade element and its respective lubrication points and then apply the lubricant. Such activity interrupts the workflow significantly.

An alternative known way of providing a lubricant to the moving parts of a movable blade element consists in using an electrically operated pump applying lubricant to the lubrication points via a network of hoses, the electric pump being fixed at a fixed point of the machine and the lubrication lines lying between fixed and mobile parts of the vehicle.

It is an aim of the current disclosure to overcome or alleviate some or all of the problems associated with the prior art.

BRIEF SUMMARY OF THE INVENTION

In one aspect, the disclosure provides a lubrication system for a vehicle provided with a blade element, wherein the blade element of the vehicle may be movable between a first position and a second position, the lubrication system including a pump connected to a reservoir of lubricant and an actuation element acting on the pump, the actuation element being activated by the blade element when displaced between the first and the second position.

In another aspect, the disclosure provides a method of lubricating a vehicle, wherein the vehicle includes a pump connected to a lubricant reservoir and an actuation element acting on the pump, the method including the steps of displacing a blade element between a first position and a second position and activating the actuation element by displacement of the blade element between the first and the second position.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure relates to a lubrication system for a vehicle provided with a blade element, wherein the blade element of the vehicle is movable between a first position and a second position, the lubrication system including a pump connected to a reservoir of lubricant and an actuation element acting on the pump, the actuation element being activated by the blade element when displaced between the first and the second position.

The pump may be a mechanical pump, for example fixed to the movable blade element and provided with a plunger element engaging with the actuation element when the blade element is proximate to the first position.

The plunger element may be depressed by the actuation element during the movement of the blade element from the second position towards the first position so as to create a pressure inside the pump, which may be suitable to dispense a displacement of a lubricant into a distribution system to feed the lubricant to at least one lubrication point.

The lubrication system may include a distribution block having an inlet for receiving the lubricant from the pump and a plurality of outlets for feeding the lubricant to respective lubrication points and may further include flexible pressure hoses detachably connected to the movable blade element and interconnecting the pump, the distribution block and the at least one lubrication point.

In one embodiment, the movable blade element may include a plurality of ducts formed thereon, accommodating the interconnecting flexible pressure hoses.

The actuation element can be arranged at one side of an ejection carriage in a same longitudinal direction as the plunger element.

In one embodiment, the actuation element may be movably mounted at one side of the ejection carriage in the axial direction of the plunger element, so as to adjust the stroke of the plunger element.

Additionally, the pump may include means to increase or decrease its stroke so as to adjust the amount of the displacement of the lubricant.

Figure 1:
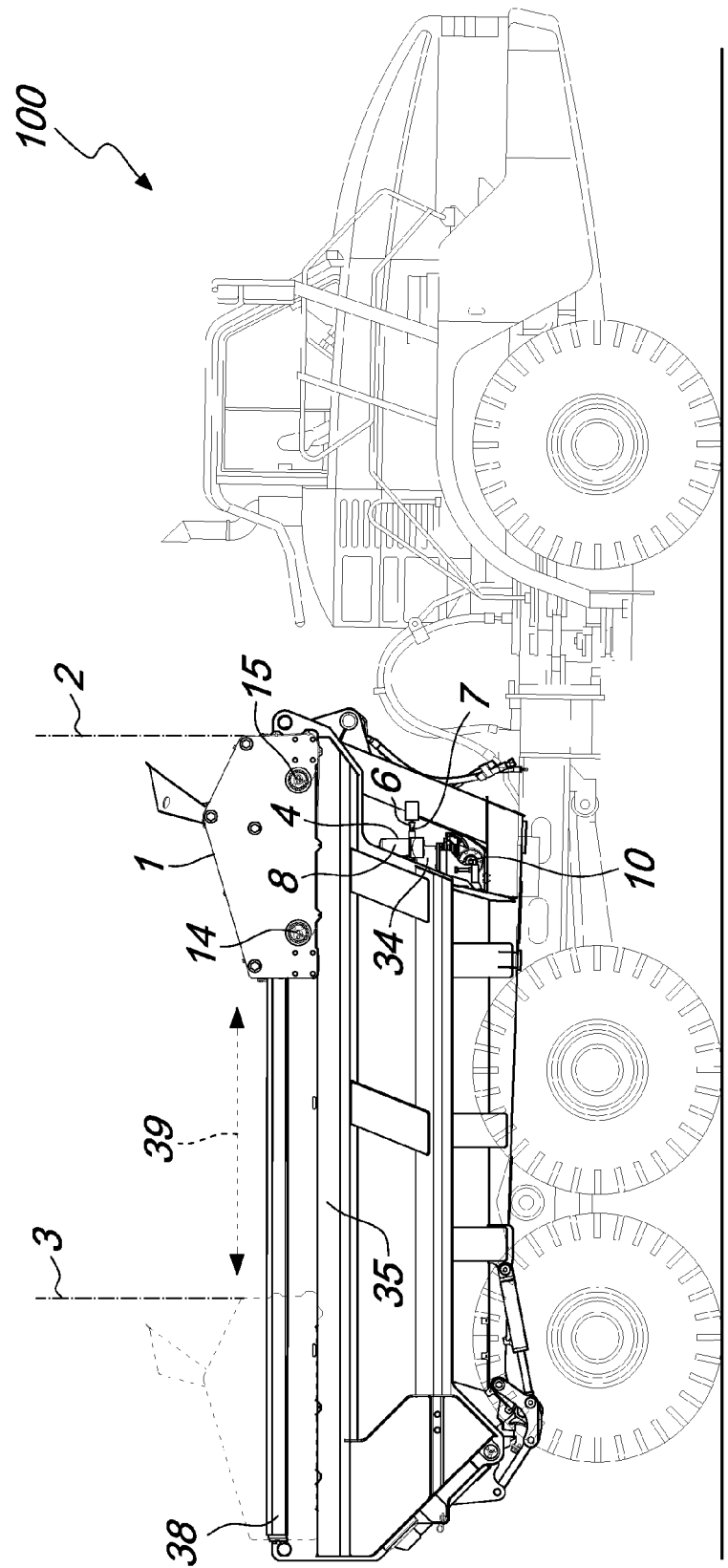
FIG. 1 is a side view depicting an articulated machine with a blade element including a lubrication system.

Referring now to FIG. 1, the lubrication system is depicted as mounted on an industrial machine, such as a vehicle 100 provided with a blade element 1 movable between a first position 2 and a second position 3. The blade element 1 may be at least partially located inside an ejection carriage 35 and may be slideably mounted on rail elements 38 or similar guides mounted or present on the ejection carriage 35. In the depicted embodiment, the blade element moves in a direction that is substantially parallel to the bottom plane of the carriage 35, as indicated by double arrow 39.

The lubrication system may comprise a pump 4 connected to a reservoir of lubricant 8 and an actuation element 6, for instance a striker, acting on the pump 4.

The actuation element 6 may be activated in response to the blade element 1 being displaced from the second position 3 towards the first position 2, by direct engagement or indirect action. The first position 2 may be defined as the position at which the blade element 1 is fully retracted, i.e. the furthest position towards the driver's cabin of the vehicle 100 in the exemplary embodiment of FIG. 1. The second position 3 may be defined as the position where the blade element 1 is fully extended, i.e. at the furthest end of the ejection carriage 35, as shown in FIG. 1 by the blade element represented in dashed lines at the rear end of the ejection carriage 35.

The pump 4 may be preferably a mechanical pump, rigidly fixed to the movable blade element 1. In one embodiment, the pump 4 may be fixed to a side wall 5 of the blade element 1, which is not exposed to the truckload. The pump 4 may be provided with a plunger element 7 that engages with the actuation element or striker 6 when the blade element 1 is proximate to the first position 2. Particularly, the actuation element 6 and the plunger element 7 may be aligned on the same longitudinal axis so that their free ends face each other.

In one embodiment, the shape of the free end of the actuation element 6 is conical, but other shapes can be used and may vary in accordance with the shape and size of the free end of the plunger element 7 to be engaged. Particularly, the actuation element 6 can be L-shaped, S-shaped or bow-shaped depending, for example, on the mounting position and, for example, to ensure that its free end faces the free end of the plunger element 7.

The stroke of the plunger element 7 may be determined by the distance between the fully extended position when the plunger element 7 is not in contact with the actuation element 6, and the fully retracted position, when the position of the blade element 1 causes the actuation element 6 to engage with the plunger element 7. More in detail, at a certain time while the blade element 1 is retracted from the second position 3 towards the first position 2, the free end of the plunger element 7 may come into contact with the actuation element 6. The plunger element 7 may then be progressively depressed by the actuation element 6 during the movement of the blade element 1 which is still advancing from the second position 3 towards the first position 2 and creates pressure inside the pump 4.

The pressure inside the pump 4 may be predetermined and suitable to dispense a displacement of a lubricant 8 into a distribution system 9 to feed the lubricant 8 to at least one lubrication point 10, 12, 14, 16, 18. When the blade element 1 moves back towards the second position 3, the plunger element 7 may progressively release from the actuation element 6 until the two elements 6 and 7 are no longer in contact.

In a different embodiment, not shown, the pump may include actuation means, which may be at least one sensor means of the electronic type. The at least one sensor means may be activated during the displacement of the blade element 1 between the second 3 and the first 2 position by sensor elements responding to electromagnetic irradiation, pressure changes or magnetic fields, or such. The sensor may transmit an electronic signal towards a processing unit adapted to actuate the pump 4 to release a lubricant. The duration of the signal actuating the pump may depend on the time between the sensor is activated and deactivated. It is also possible to predetermine the time inside the processing unit by using a known timer element. The at least one sensor means may be located on the rail elements 38, or on the bottom of the ejection carriage 35, which may be activated when the blade element's rollers, i.e. carriage and floor rollers, respectively, are moving from the second position 3 towards the first position 2. Alternatively, the activation and deactivation of the pump 4 may be obtained by interrupting the light passage of a photo sensor element, when the blade element 1 is entering the light path of the photo sensor. In another alternative, sensors detecting a magnetic field may be used, such as Hall-effect sensors, for actuation of the pump 4 when the blade element 1 moves from the second position 3 towards the first position 2.

Figure 2:
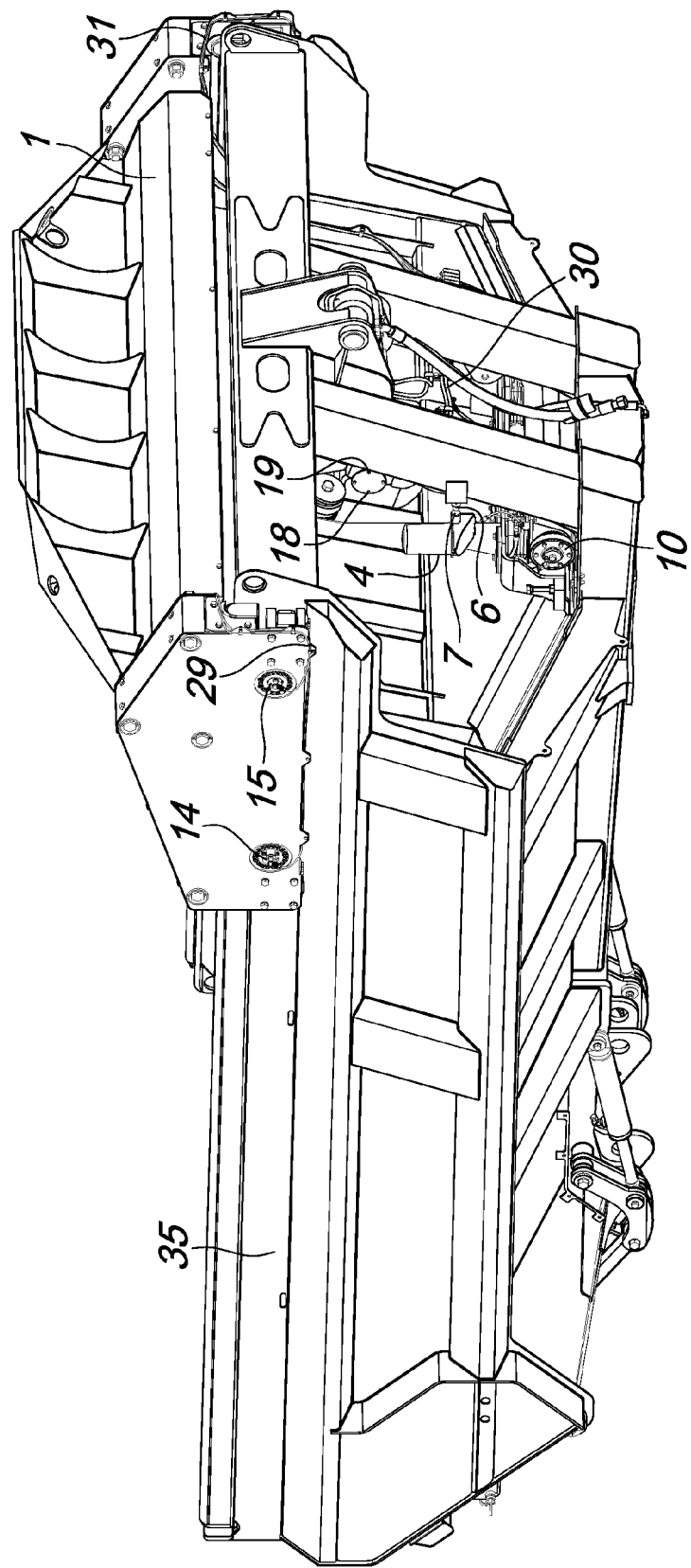
FIG. 2 is a perspective view of a load carriage with a blade element including a lubrication system.

FIG. 2 shows in more detail an ejection carriage 35 provided with a blade element 1 and an exemplary embodiment of the automatic lubrication system. The movable blade element 1 may be supported by two floor rollers when moving between the first 2 and the second 3 position. The floor rollers may have associated lubrication points 10, which may be interconnected to the pump 4 via a network of flexible pressure hoses 29, 30, 31. The hose pair 29 may feed a lubrication point 14 for a top rail roller and a lubrication point 15 of a side roller, the top rail roller and the side roller being associated with the blade element 1 on one of the two sides of the blade element 1. Respective lubrication points (not visible in the drawing) for a second top rail roller and a second side roller may be located on the opposite side of the blade element 1. The second top rail roller and the second side roller may be associated with the blade element 1 and may be interconnected by an additional hose pair 31. Another hose pair 30 may interconnect the pump 4 with a distribution block 22. The purpose of the distribution block 22 may be to centrally distribute the lubricant 8 received from the pump 4 to the respective destination lubrication points. A round-shaped element which may have two associated lubrication points 18, 19 for lubricating the hydraulic ram may be located in proximity to the hydraulic ram pushing the blade element 1.

Figure 3:
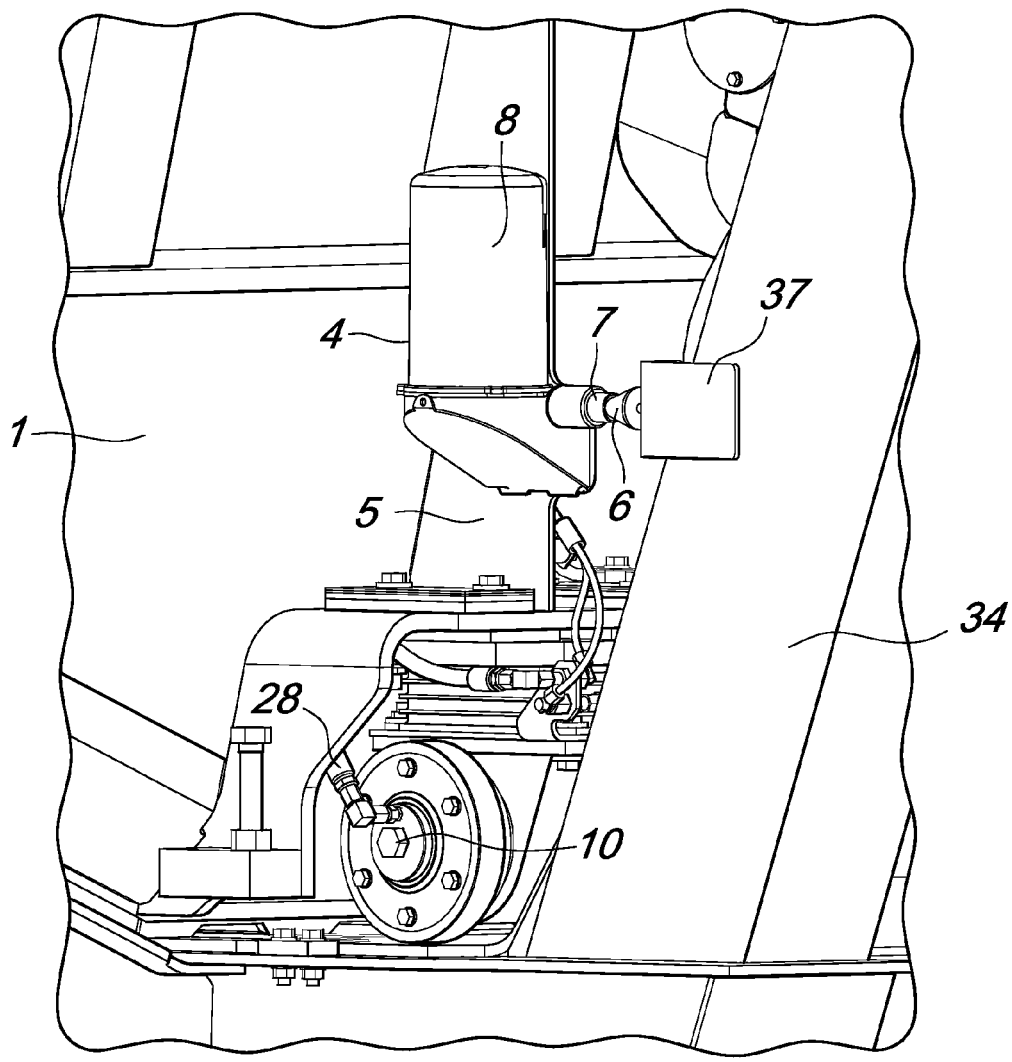
FIG. 3 is a detailed view of a lubrication system depicting a mechanical pump mechanism.

FIG. 3 shows a more detailed view of the elements introduced in FIG. 1. In this embodiment, the plunger element 7 is substantially round-shaped and is shown in FIG. 3 in an actuated position, i.e. in contact with a conical-shaped actuation element 6. The pump 4 may be mounted at a side wall 5 and may be fixed substantially perpendicular to the blade element 1. The actuation element 6 may be mounted by means of a plate 37 at one side 34 of the ejection carriage 35 in the same longitudinal direction as the plunger element 7.

In a different embodiment (not shown), the actuation element 6 may be movably mounted at one side 34 of the ejection carriage 35 in the axial direction of the plunger element 7, so as to permit adjustment of the stroke of the plunger element 7 by adjusting the position of the actuation element 6.

In further embodiments, the pump 4 itself may include means to increase or decrease its stroke, so as to adjust the amount of the displacement of the lubricant 8. The means to increase or decrease the stroke of the pump may be for instance constituted by a slider mechanism attached to the side wall 5 on which the pump 4 can be detachably locked and fixed in certain positions along the sliding mechanism.

Alternatively, both the actuation element 6 and the pump 4 can be movably mounted through slider mechanisms, one for the pump 4 and one for the actuation element 6, to detachably fix the pump 4 and/or the actuation element 6 in certain positions at appropriate mutual distance, in order to adjust the distance between them and, consequently, the stroke of the plunger element 7.

FIG. 3 also shows a flexible pressure hose 28 adapted to feed a lubricant 8 to the lubrication point 10 of the floor roller, positioned below the pump 4.

Figure 4:
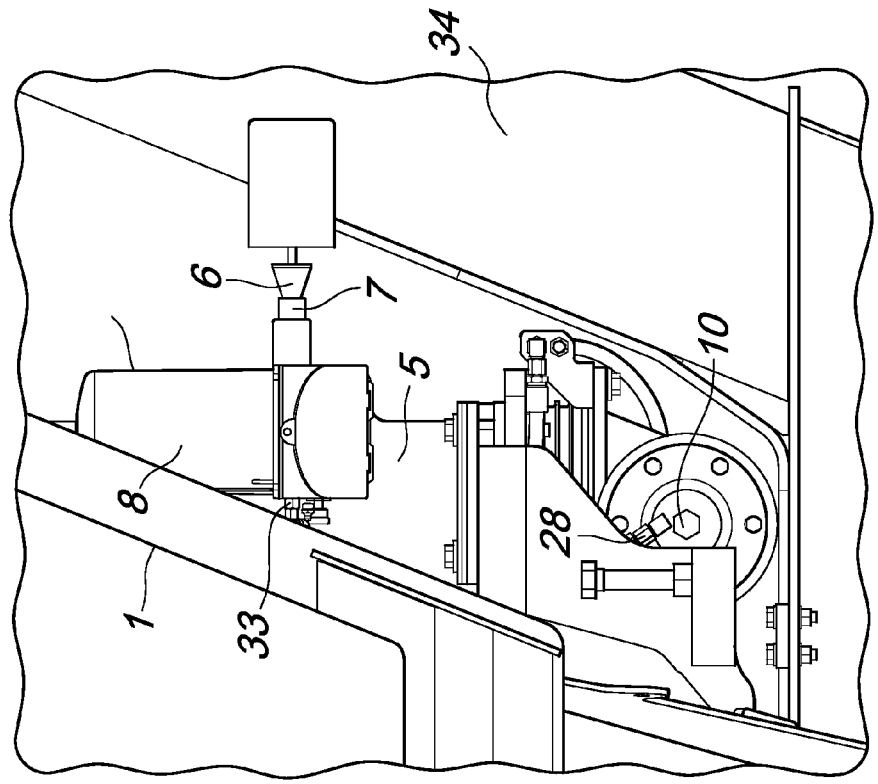
FIG. 4 is a side view of FIG. 3 depicting a lubrication system in non-actuated position.
Figure 5:
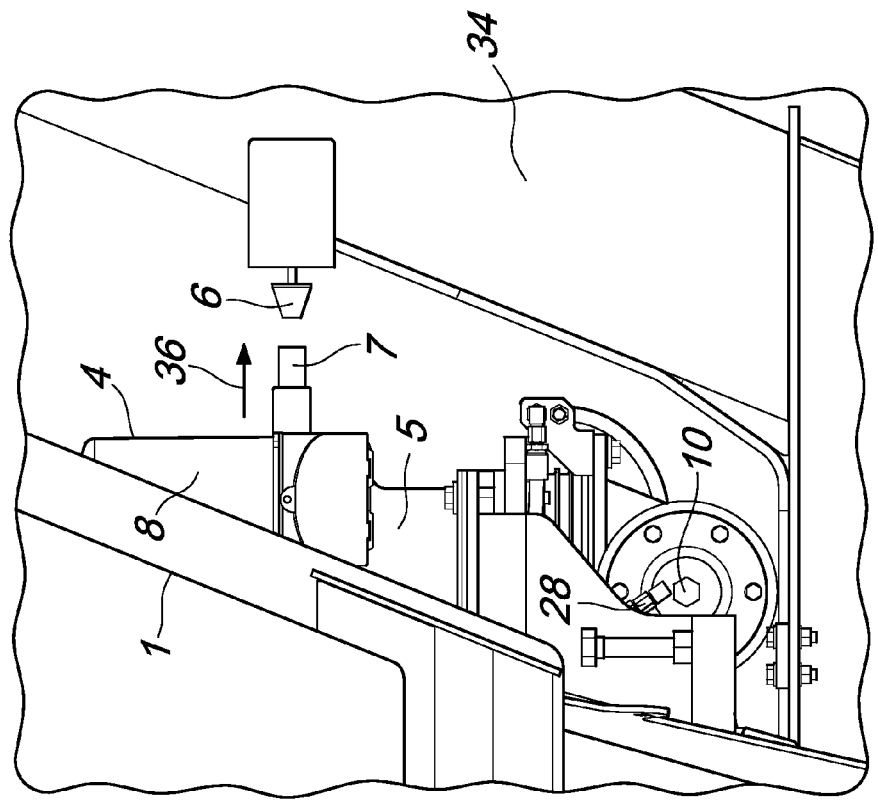
FIG. 5 is a side view of FIG. 3 depicting a lubrication system in actuated position.

Operation of the automatic lubrication system is better illustrated in FIG. 4 and FIG. 5, which exemplify actuation of the pump 4 when the blade element 1 is being moved towards the first, retracted position 2. As shown in FIG. 4, the plunger element 7 and the actuation element 6 are mutually spaced. No pressure is applied to the pump 4 and no lubricant is being released. The moving direction of the blade element 1 with the mounted pump 4 thereon is indicated by arrow 36, which points towards the actuation element 6. As soon as the blade element 1, while moving towards the first position 2, has been sufficiently retracted, the actuation element 6 first contacts and then starts depressing the plunger element 7, until a fully retracted first position 2 is reached, as shown in FIG. 5.

Figure 6:
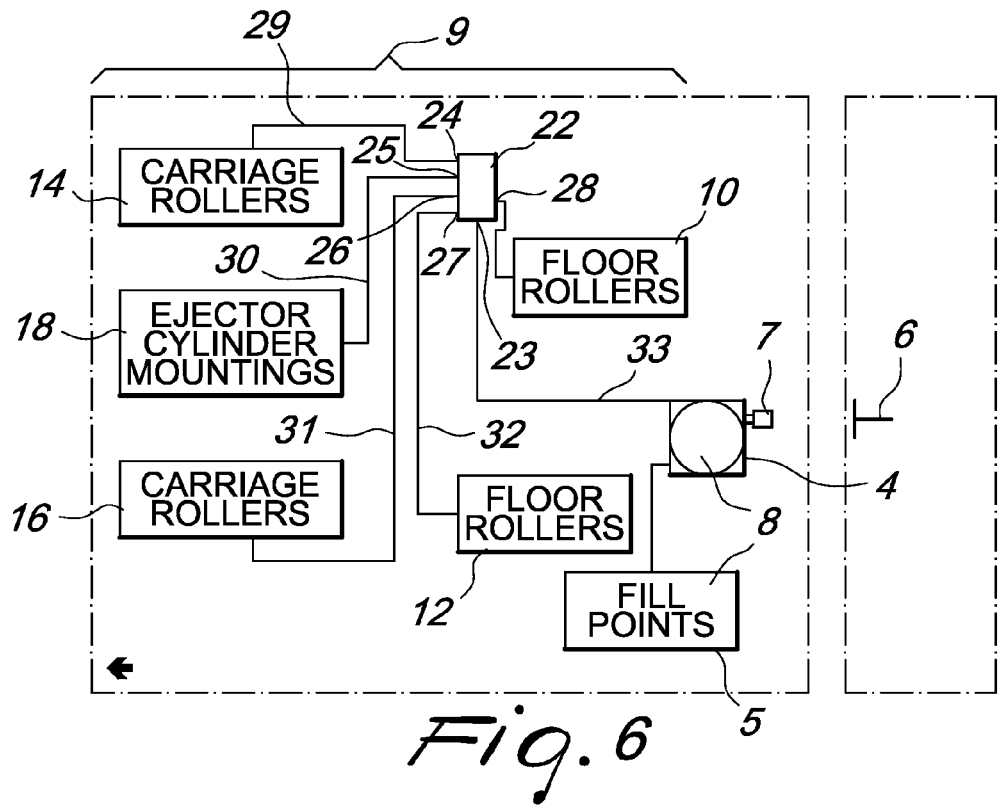
FIG. 6 is a schematic diagram depicting a lubrication system and the lubrication points in non-actuated position.
Figure 7:
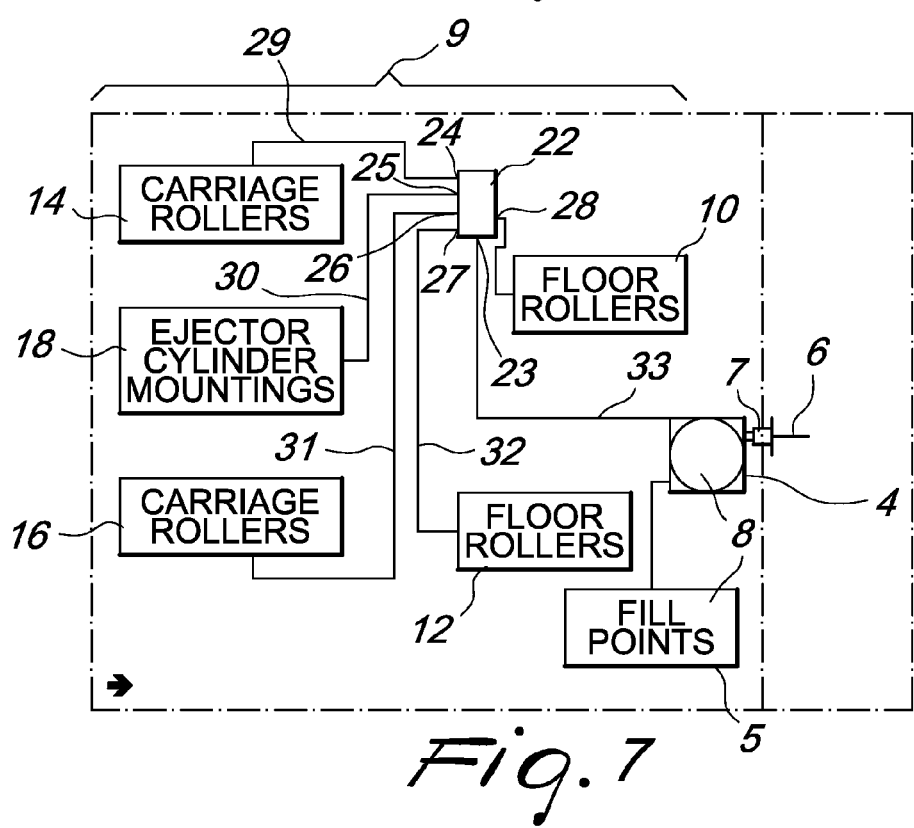
FIG. 7 is a schematic diagram depicting a lubrication system and the lubrication points in actuated position.

Referring now to the block diagrams of FIG. 6 and FIG. 7, a distribution system 9 of the automatic lubrication system is schematically depicted. The distribution system 9 may include a distribution block 22 having an inlet 23 for receiving the lubricant 8 from the pump 4 and a plurality of outlets 24, 25, 26, 27 for feeding the lubricant 8 to respective lubrication points 10, 12, 14, 16, 18. The lubrication points may include carriage rollers 14 and 16, floor rollers 10 and 12 and ejector cylinder mountings 18.

The carriage rollers 14, 16 and the floor rollers 10, 12 may be pairs of rollers while the ejector cylinder mountings lubrication points 18 may be constituted by at least four lubrication points.

As shown in FIG. 7, the lubricant 8 may be driven through the flexible pressure hoses 29, 30, 31, 32, 33 when the automatic lubrication system is actuated. The flexible pressure hoses 29, 30, 31, 32, 33 may be detachably connected to the movable blade element 1 and may interconnect the pump 4, the distribution block 22 and the at least one lubrication point 10, 12, 14, 16, 18.

In another embodiment, the blade element 1 may include a plurality of ducts, not shown in the figures, formed thereon to accommodate the interconnecting flexible pressure hoses 29, 30, 31, 32, 33. The ducts may prevent the flexible pressure hoses from being damaged during operation of the vehicle 100 or by environmental influences.

INDUSTRIAL APPLICABILITY

The above disclosed automatic lubrication system for an industrial machine, such as an articulated truck having a moving blade element, may increase component reliability due to regular automatic lubrication, for example, every time the blade element moves into retracted position. This may enable the vehicle to be operated without interruption by the operator manually lubricating the lubrication points.

Since when using one envisioned embodiment an operator does not need to climb into the vehicle to lubricate the lubrication points manually it further enhances convenience. Furthermore, it has been shown that the system may be easy to implement using common components, may be designed to be independent from any power supply, since it may be designed to be fully activated by mechanical elements, may be easy to upgrade, may be designed to assure uninterrupted operation, may be arranged to be easy and safe to maintain and may include features that may easily be adjusted with regard to the amount of grease to be released. The industrial applicability of the automatic lubrication system described herein will be readily appreciated from the foregoing discussion.

Even if the invention discloses an automatic lubrication system for a vehicle with a movable blade element, it is understood that it can also be adapted, without undue experimentation, to different vehicles having similar features or movable components needing lubrication.

It will be appreciated that the foregoing description provides examples of the disclosed system and technique. However, it is contemplated that other implementations of the disclosure may differ in detail from the foregoing examples. All references to examples or embodiments herein are intended to reference the particular example being discussed at that point and are not intended to imply any limitation as to the scope of the invention more generally as claimed. All language of distinction and disparagement with respect to certain features is intended to indicate a lack of preference for those features, but not to exclude such from the scope of the invention entirely unless otherwise indicated.

Any references to front and back, left and right, top and bottom, upper and lower, and forward and backward, are intended for convenience of description, not to limit the present invention or its components to any one positional or spacial orientation.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than the foregoing description, and all changes that come within the meaning and range of equivalence of the claims are therefore intended to be embraced therein.

The invention claimed is:

1. A vehicle, comprising:
   a carriage having rail elements and a bottom plane;
   a blade element being slideably mounted on the rail elements and movable parallel to the bottom plane of the carriage between a first position and a second position; and
   a lubrication system comprising:
      a pump connected to a reservoir of lubricant, wherein said pump is a mechanical pump and is rigidly fixed to said movable blade element; and
      an actuation element acting on said pump, said actuation element being activated
   in response to said blade element being displaced between said first and said second position, wherein the blade element is located at least partially inside the carriage, and the actuation element is fixed to the carriage.

2. The lubrication system according to claim 1, wherein said pump is provided with a plunger element in contact with said actuation element when said blade element is proximate to said first position, but the plunger element being out of contact with the actuation element when the blade element is at the second position.

3. The lubrication system according to claim 2, wherein said plunger element is depressed by said actuation element during the movement of said blade element from said second position towards said first position so as to create a pressure inside said pump.

4. The lubrication system according to claim 3, wherein the pressure inside said pump created by the depression of said plunger element is suitable to dispense a displacement of a lubricant into a distribution system to feed said lubricant to at least one lubrication point.

5. The lubrication system according to claim 4, wherein said distribution system includes a distribution block having an inlet for receiving said lubricant from said pump and a plurality of outlets for feeding said lubricant to respective lubrication points.

6. The lubrication system according to claim 5, wherein it further includes flexible pressure hoses detachably connected to said movable blade element, said flexible pressure hoses interconnecting said pump, said distribution block and said at least one lubrication point.

7. The lubrication system according to claim 6, wherein said movable blade element includes a plurality of ducts formed thereon, said ducts accommodating said interconnecting flexible pressure hoses.

8. The lubrication system according to claim 4, wherein said actuation element is arranged at one side of said carriage in a same longitudinal direction as said plunger element.

9. The lubrication system according to claim 8, wherein said actuation element is mounted at one side of said carriage in the axial direction of said plunger element, so as to adjust the stroke of said plunger element.

10. The lubrication system according to claim 9, wherein said pump includes means to increase or decrease its stroke so as to adjust the amount of the displacement of said lubricant.

11. A method of lubricating a vehicle, the method comprising the steps of:
    displacing a blade element that is slideably mounted on rail elements of a carriage between a first position and a second position, the rail elements being parallel to a bottom plane of the carriage;
    activating an actuation element of a pump connected to a lubricant reservoir by displacement of said blade element between said first and said second positions, wherein said pump is mounted to said movable blade element, and the actuation element is mounted to the carriage;
    initiating a depression of a plunger element associated with said pump by said actuation element coming in contact with the plunger element when said blade element is proximate to said first position;
    creating a pressure inside said pump suitable to cause a lubricant to exit said pump;
    dispensing said lubricant into a distribution system; and
    moving the pumping element out of contact with the actuation element by moving the carriage toward the second position.

12. The method according to claim 11, wherein said pump is a mechanical pump.

13. The method according to claim 11, further including the step of dispensing said lubricant using the distribution system having a distribution block with an inlet for receiving said lubricant from said pump and a plurality of outlets for feeding said lubricant to respective lubrication points.

14. The method according to claim 13, wherein dispensing of said lubricant is carried out using flexible pressure hoses detachably fixed to said movable blade element interconnecting said pump, said distribution block and said at least one lubrication point.

15. The method according to claim 13, wherein said movable blade element includes a plurality of ducts formed thereon to accommodate said interconnecting flexible pressure hoses.

16. The method according to claim 11, wherein said actuation element is arranged at one side of said carriage in a same longitudinal direction as said plunger element.

17. The method according to claim 11, wherein said actuation element is movably mounted at one side of said carriage so as to adjust the stroke of said plunger element.

* * * * *